(12) United States Patent
Bourqui et al.

(10) Patent No.: US 11,218,043 B2
(45) Date of Patent: Jan. 4, 2022

(54) ROTOR ASSEMBLY FOR ELECTRIC MOTOR

(71) Applicant: Johnson Electric International AG, Murten (CH)

(72) Inventors: Yvan Bourqui, Corminboeuf (CH); Daniel Soncini, Fribourg (CH); Bruno Neuhaus, Wallenried (CH)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 256 days.

(21) Appl. No.: 16/504,116

(22) Filed: Jul. 5, 2019

(65) Prior Publication Data

US 2020/0014264 A1 Jan. 9, 2020

(30) Foreign Application Priority Data

Jul. 5, 2018 (GB) ..................................... 1811052

(51) Int. Cl.
| | |
|---|---|
| *H02K 1/30* | (2006.01) |
| *H02K 1/02* | (2006.01) |
| *H02K 1/24* | (2006.01) |
| *H02K 7/00* | (2006.01) |
| *H02K 7/116* | (2006.01) |
| *H02K 15/02* | (2006.01) |
| *H02K 15/12* | (2006.01) |
| *H02K 37/04* | (2006.01) |
| *H02K 37/24* | (2006.01) |
| *B29C 45/14* | (2006.01) |

(Continued)

(52) U.S. Cl.
CPC .......... *H02K 1/30* (2013.01); *B29C 45/14467* (2013.01); *F16H 55/17* (2013.01); *F16H 57/0018* (2013.01); *H02K 1/02* (2013.01); *H02K 1/246* (2013.01); *H02K 7/003* (2013.01); *H02K 7/116* (2013.01); *H02K 15/022* (2013.01); *H02K 15/12* (2013.01); *H02K 37/04* (2013.01); *H02K 37/24* (2013.01); *B29K 2077/00* (2013.01); *B29K 2705/12* (2013.01); *B29L 2031/7498* (2013.01)

(58) Field of Classification Search
CPC ....................................................... H02K 1/17
USPC .................. 310/43, 44, 75 R, 83, 98–99
See application file for complete search history.

(56) References Cited

U.S. PATENT DOCUMENTS

| | | | | |
|---|---|---|---|---|
| 5,500,994 | A | * | 3/1996 | Itaya .................... H02K 1/2733 264/272.2 |
| 2013/0104682 | A1 | * | 5/2013 | Schneider ............. F16H 57/021 74/421 A |
| 2020/0373795 | A1 | * | 11/2020 | Yamamoto ............. H02K 3/522 |

FOREIGN PATENT DOCUMENTS

| | | | | | |
|---|---|---|---|---|---|
| JP | 01186157 | A | * | 7/1989 | |
| JP | 11204320 | A | * | 7/1999 | ........... H01F 41/026 |
| JP | 2006288069 | A | * | 10/2006 | |

* cited by examiner

*Primary Examiner* — Jose A Gonzalez Quinones
(74) *Attorney, Agent, or Firm* — Millman IP Inc.

(57) ABSTRACT

A rotor assembly is provided for an electric motor. The rotor assembly includes: a cylindrical magnet member having magnetization in both axial and radial directions, the magnet member being formed from a moldable magnetic material; and an output shaft receivable within the magnet member. An inner surface of the magnet member and an outer surface of the output shaft have complementarily-engagable interface elements thereon to prevent or limit dislocation of the magnet member and output shaft, and at least one of the interface elements is formed by overmolding of the magnet member and output shaft with the other of magnet member and output shaft.

20 Claims, 5 Drawing Sheets

(51) Int. Cl.
    *F16H 55/17*    (2006.01)
    *F16H 57/00*    (2012.01)
    *B29K 77/00*    (2006.01)
    *B29K 705/12*   (2006.01)
    *B29L 31/00*    (2006.01)

ROTOR ASSEMBLY FOR ELECTRIC MOTOR

CROSS REFERENCE TO RELATED APPLICATIONS

This non-provisional patent application claims priority under 35 U.S.C. § 119(a) from Patent Application No. 1811052.8 filed in the United Kingdom on Jul. 5, 2018.

FIELD

The present disclosure relates to a rotor assembly, in particularly but not exclusively for use in an electric motor such as a stepper motor. The disclosure also relates to an electric motor having such a rotor assembly.

BACKGROUND

Electric motors, and in particular brushless motors such as stepper motors or BLDC motors, are used to provide precision control of actuation, since the motor can be actuated in very small precise steps. Typically, there is some internal referencing of the position of the motor, which can be inferred or calculated based on a rotational position of the rotor thereof, for example, by accurate detection of the magnetic field of the rotor.

To achieve a useful motor, the rotor must have several critical properties. Firstly, there must be a well-defined magnetic field, preferably in both the axial and radial directions such that accurate sensing of the field can be achieved. Secondly, the rotor must be able to operate to a specific operating temperature. Thirdly, the rotor must be sufficiently robust to be able to provide the necessary torque requirements for the motor.

Rotor assemblies commonly encounter issues with the above criteria. It is difficult to integrate the output shaft of the rotor with the magnet or magnets which produce the magnetic field, particularly if there is a requirement for bi-directional magnetization, that is, in both axial and radial directions of the rotor.

One option is to adhesively connect the output shaft to the magnet. The difficulty here is that adhesives typically degrade under high operating temperatures, reducing the effectiveness of the motor. Slippage between the rotational positions of the magnet and output shaft is also an issue, as this can result in damage to the output shaft under high torque. Gluing of the components together also increases the cost and difficulty of producing a rotor assembly.

Another issue is that the creation of a bi-directional magnetization of the magnet member of the rotor assembly requires the use of an electromagnetically-generated magnetic field to impart the necessary magnetization. This generates a lot of heat in the tooling, which can result in deformation of other components of the rotor which may not be able to withstand such high temperatures. This has previously hampered the development of improved rotors. Additionally, if for any reason, one or more of the electromagnetic coils or similar elements do not correctly activate, any rotors produced by this method will fail to operate correctly.

SUMMARY

The present disclosure seeks to provide a rotor assembly which is sufficiently robust for use in an electric motor such as a stepper motor, having bi-directional magnetization, and which utilises no adhesive in its construction.

According to a first aspect of the disclosure, there is provided a rotor assembly for an electric motor, the rotor assembly comprising: a cylindrical magnet member having magnetization in both axial and radial directions, the magnet member being formed from a moldable magnetic material; and an output shaft receivable within the magnet member; wherein an inner surface of the magnet member and an outer surface of the output shaft have complementarily-engagable interface elements thereon to prevent or limit dislocation of the magnet member and output shaft, at least one of the interface elements being formed by overmolding of the magnet member and output shaft with the other of magnet member and output shaft.

The provision of a rotor assembly in which the magnet member and the output shaft are overmolded together eliminates the requirement for there to be any separate components which must be interengaged. As such, the rotor assembly can be assembled as a unitary component, which significantly reduces the manufacturing cost and complexity of a motor including such an assembly. The rotor assembly can also remove the need for any adhesive components to be utilised in the manufacture, which can be prone to thermal degradation, reducing the lifespan of the motor.

Preferably, the magnet member may be formed from a mixture of magnetic material and polymer resin, and the magnetic material may comprise rare earth magnetic material.

In order to provide a flowable material which can be magnetized so as to have a precise and accurate magnetic field, the best option is to provide rare earth magnetic material suspended in a flowable and settable resin compound.

The output shaft may be formed from a moldable material, and more preferably an injection-moldable plastics material.

The overmolding the magnet member and output shaft is in the use of materials which can be overmolded without one or other of the materials deforming in the process.

Optionally, the output shaft may comprise an integrally formed pinion gear.

Integral formation of the pinion gear improves the robustness of the output shaft, since the interface between the output shaft and the gear is traditionally a source of weakness in the construction of the rotor assembly.

Preferably, the output shaft may comprise at least one base portion.

The presence of a base portion, preferably formed as a shoulder on the output shaft, if the magnet member is overmolded to the output shaft, can result in an improved uniformity of magnetization of the magnet member, since the base portion interrupts the rapid axial flow of the moldable magnetic material from injection nozzles through the void of the relevant tooling. This allows the moldable material to fill the void more naturally.

In one preferable embodiment, the magnet member may be a multi-pole magnet member, preferably having between six and twenty poles.

A high-polarity magnetic field produced by the rotor assembly permits highly accurate determination of the rotation position of the rotor, which is important in particular in stepper motor contexts.

Optionally, the interface element of the magnet member may comprise an—inward projection.

Preferably, the complementarily-engagable interface element of the output shaft may be formed as a receiving channel for the inward projection of the magnet member.

A projection, preferably inwardly offset from one or other opening of the bore, advantageously provides a suitable counter-mold for the overmolding process such that the output shaft will be formed with axial retention stops either side of the projection, thereby preventing axial displacement of the magnet member and output shaft.

The complementarily-engagable interface elements may additionally, or alternatively, be circumferentially asymmetric.

Such an arrangement advantageously prevents or limits the propensity for the magnet member and output shaft to rotationally dephase, which can otherwise cause failure of the rotor assembly during use.

Preferably, the inner surface of the magnetic member and the outer surface of the output shaft may form a shape-fit interface.

The provision of a shape-fit, form-fit, geometric-fit, or similar form-locking arrangement, that is, having a non-cylindrical interface, provides a security against rotational dephasing of the magnetic member and output shaft at high rotational speeds.

Preferably, the magnet member may comprise at least one guide projection on an axial end surface thereof.

The provision of a guide projection on the rotor assembly can advantageously limit the potential for burrs on the rotor assembly from jamming in any transitory mechanisms during the manufacturing process.

According to a second aspect of the disclosure, there is provide an electric motor comprising a stator and a rotor assembly in accordance with the first aspect of the disclosure. The electric motor may preferably be a brushless motor, and more preferably may be a stepper motor or BLDC motor.

An electric motor including the rotor assembly as previously described is simpler to manufacture due to the reduced number of component parts, as well as being less prone to failure at high temperatures and torques.

According to a third aspect of the disclosure, there is provided a rotor assembly for an electric motor, the rotor assembly comprising: a cylindrical magnet member formed from a moldable magnetic material; and an output shaft receivable within the magnet member; wherein one of the cylindrical magnet member and output shaft is formed by overmolding to the other of the cylindrical magnet member and output shaft so as to prevent relative dislocation therebetween.

Overmolding of the magnet member and output shaft provides a mechanism of creating a unitary rotor assembly which is robust and suitable for use at high torque and/or temperature.

According to a fourth aspect of the disclosure, there is provided a method of forming a rotor assembly in accordance with the first or third aspect of the disclosure, the method comprising the steps of: a] providing a first tooling having a mold shape to form one of the magnet member and/or output shaft; b] molding the one of the magnet member and/or output shaft by injecting a flowable material into the first tooling and allowing it to set; c] providing a second tooling having a mold shape to form the rotor assembly; and d] inserting the one of the magnet member and/or output shaft into the second tooling and injecting a flowable material into the second tooling and allowing it to set.

The present method allows for the overmolding of a rotor assembly in which the magnet member and output shaft are formed together, thereby reducing the total number of components required to form an electric motor having such a rotor assembly.

In one preferable embodiment, the second tooling may comprise a plurality of permanent magnets arranged to impart a bi-directional magnetization to the magnet member. In an alternative embodiment, the first tooling may comprise a plurality of permanent magnets arranged to impart a bi-directional magnetization to the magnet member.

The use of permanent magnets removes many of the complications associated with electromagnetic coil impartation of the magnetization of the magnet member, which otherwise has impeded the development of such a rotor assembly.

Preferably, during step a], the first tooling may have a mold shape to form the output shaft, and, during step d], the injection of the flowable material into the second tooling may be aligned to at least a portion of the output shaft.

Aligning the injection nozzles to the output shaft can interrupt the flow of the moldable magnetic material, which can result in a more uniform eventual magnetization of the magnet member.

A method of forming a rotor assembly in accordance with the first or third aspects of the disclosure, the method comprising the steps of: a] providing a tooling having a mold shape to form the magnet member, the tooling comprising a plurality of permanent magnets arranged to impart a bi-directional magnetization to the magnet member; b] inserting the output shaft into the tooling; c] injecting a flowable magnetic material into the tooling around the output shaft and allowing the flowable magnetic material to set.

It may be possible to pre-form the output shaft, and then apply the magnetic material thereover in an injection molding process, without necessarily needing to mold the output shaft itself.

Preferably, during step c], the flowable magnetic material may be injected via a number of injection nozzles which is equal to, proportional to, or a factor of a number of magnetic poles to be created by the plurality of permanent magnets. More preferably, the ratio of injection nozzles to magnetic poles may be 1:2.

Making a correspondence between the number of magnetic poles and the number of injection points may result in a more uniform magnetic field being produced around the circumference of the rotor assembly.

According to a sixth aspect of the disclosure, there is provided a tooling set for manufacturing a rotor in accordance with the first or third aspects of the disclosure, the tooling set comprising a first tooling having a mold shape to form one of the magnet member and output shaft, and a second tooling having a mold shape to form the rotor assembly, wherein one of the first and second toolings comprises a plurality of permanent magnets arranged to impart a bi-directional magnetization to the magnet member.

BRIEF DESCRIPTION OF THE DRAWINGS

The disclosure will now be more particularly described, by way of example only, with reference to the accompanying drawings, in which.

DETAILED DESCRIPTION

Figure 1:
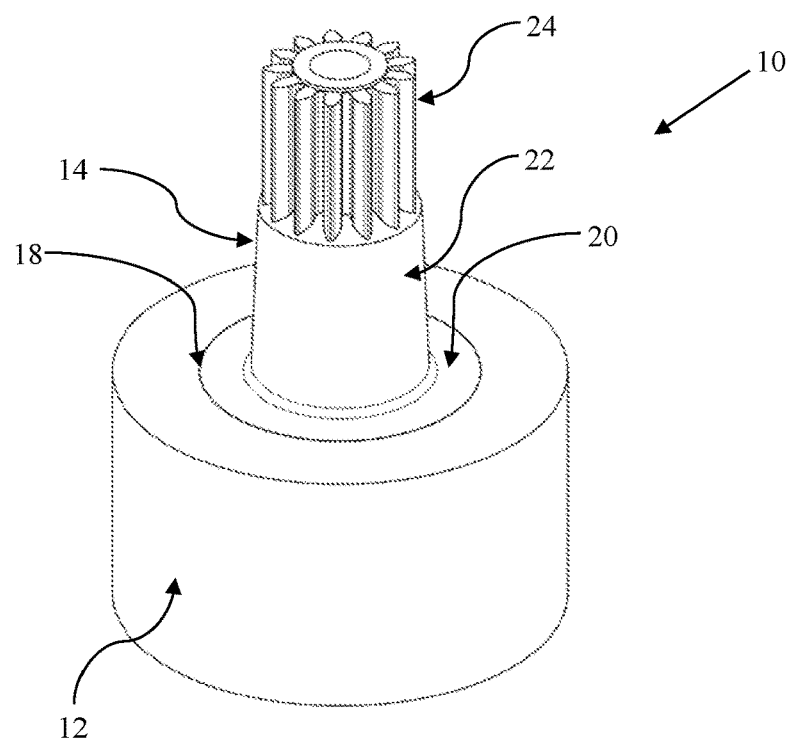
FIG. 1 shows a front view of a first embodiment of a rotor assembly in accordance with the first aspect of the disclosure.
Figure 2:
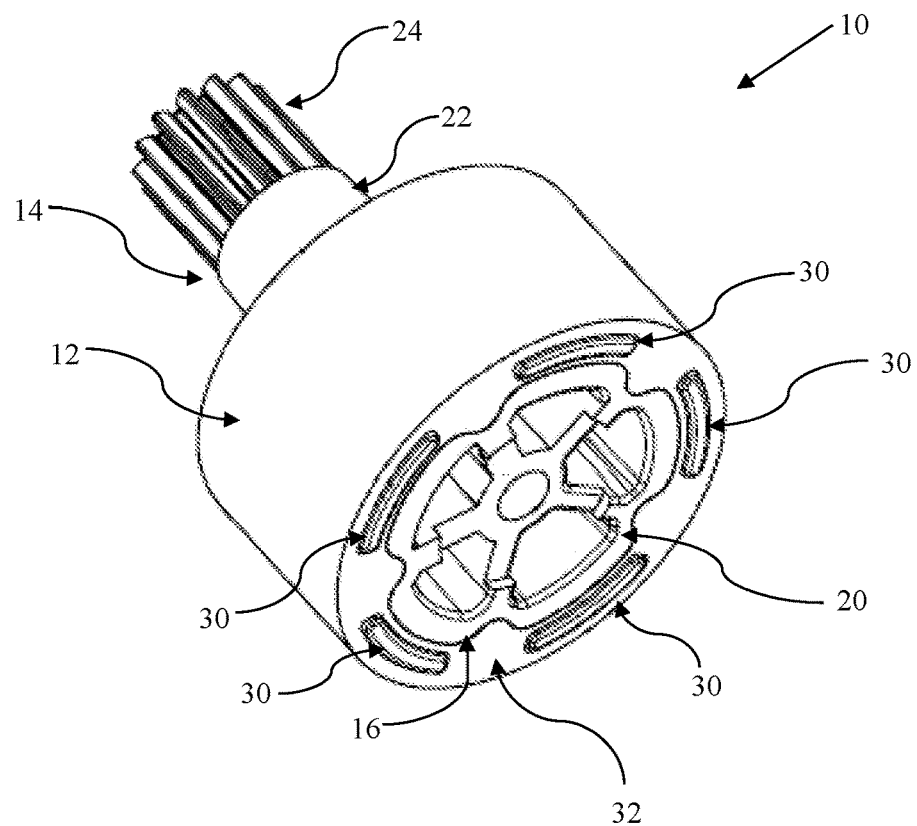
FIG. 2 shows a lower view of the rotor assembly shown in FIG. 1.

Referring to FIGS. 1 and 2, a rotor assembly is indicated globally at 10, which is robust and can be manufactured without needing to assemble several intermediate components or utilise adhesives.

The rotor assembly 10 comprises a magnet member 12 and an output shaft 14 which are formed together by overmolding one of the magnet member 12 and output shaft 14 to the other. This is, one of the components is first molded, and then the other component is overmolded in situ, such that the magnet member 12 and output shaft 14 are formed together as a single rotor.

The magnet member 12 is formed to be cylindrical, with at least part of the output shaft being receivable or formed within an inner radius or volume of the magnet member 12.

In order for the magnet member 12 to be moldable, it must be formed from a moldable magnetic or magnetisable material. In this instance, the magnet member 12 is formed from a mixture of magnetic material and polymer resin, which, once molded, can be magnetised in accordance with manufacturing preference. It is preferred that the magnetic material be a rare earth magnetic material, such as NdFeB or SmCo, but ferritic materials could also be considered, for instance.

The output shaft 14 is formed so as to be engagable within the inner volume of the magnet member 12, and has a magnet-contact body portion 20 which is substantially or fully receivable within the inner volume of the magnet member 12, and a shaft portion 22 which protrudes from the magnet member 12 along the axis of rotation of the rotor assembly 10. The inner volume could feasibly be considered to have a radius relative to the axis of the output shaft 14, despite the non-cylindrical shape of the present arrangement. The output shaft 14 may then also include a geared element, preferably a pinion gear 24, which is preferably integrally formed with the shaft portion 22. A thirteen-tooth pinion gear is illustrated in the drawings, but it will be appreciated that the number of gear teeth will be dependent on the motor application.

The magnet-contact body portion 20 here has a non-cylindrical geometric shape, here having a five-fold axis of symmetry. This permits a shape-fit, form-fit, geometric-fit, or similar form-locking arrangement with the magnet member 12, thereby rotationally phase-locking the magnet member 12 and output shaft 14.

Whilst an output shaft 14 is illustrated in which the magnet-contact body portion 20, shaft portion 22 and pinion gear 24 are all formed together as a unitary piece, it will be appreciated that only the magnet-contact body portion 20 need necessarily be overmolded with the magnet member 12. For example, a separate shaft could be attached following the molding process, or the geared element could be included as a separate component. However, for ease of manufacture, it is preferred that the entire output shaft 14 be unitarily molded.

The output shaft 14 is formed from a moldable material, and preferably a moldable plastics material such as a polyamide (PA). Other plastics materials could also be considered, such as polyoxymethylene (POM), polypropylene (PP), thermoplastic elastomer (TPE), and other variants will be understood to the skilled person. Typically, the material forming the output shaft 14 will be a non-magnetic material.

Figure 3:
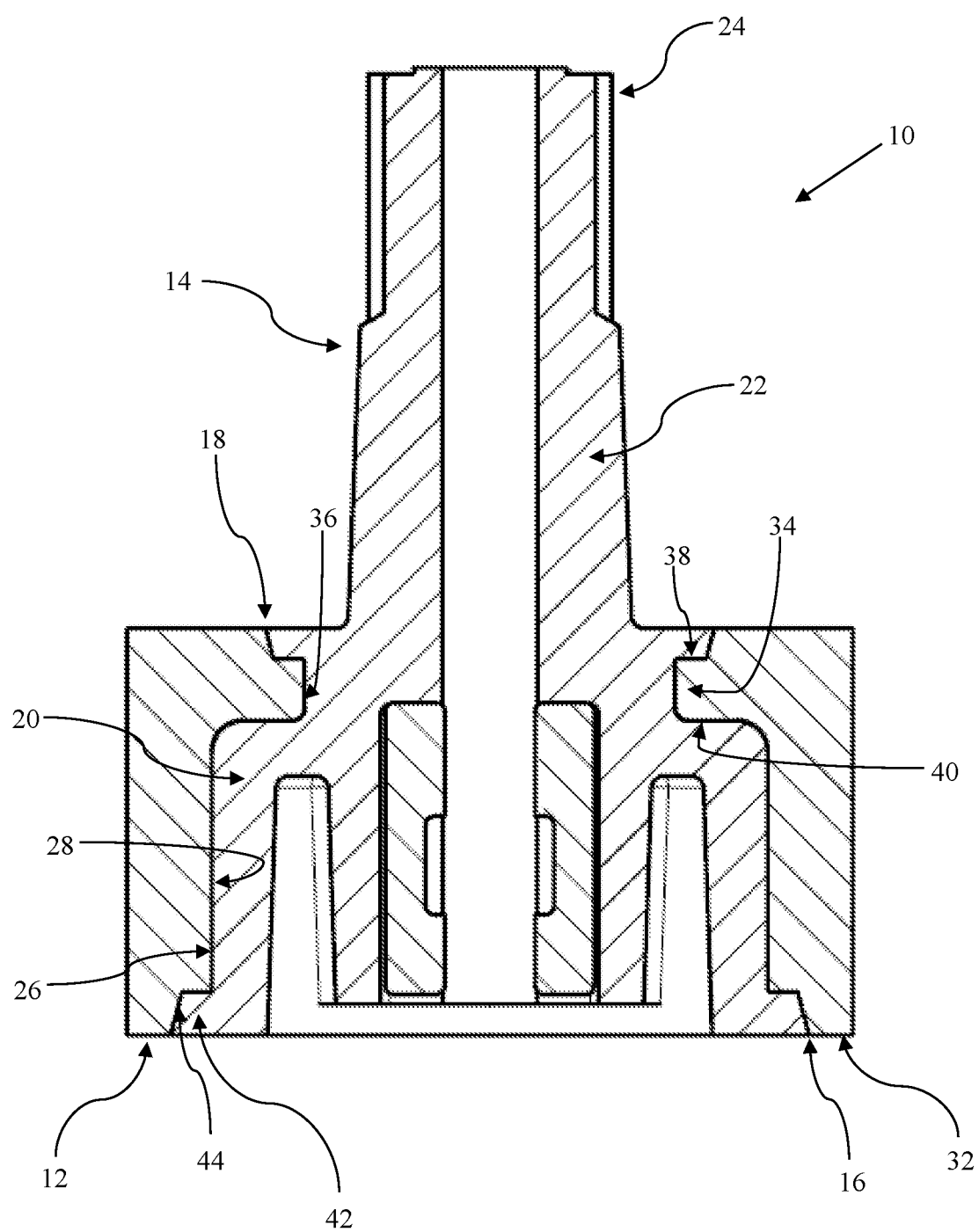
FIG. 3 shows a vertical cross-section through the rotor assembly shown in FIG. 1.

The engagement between the magnet member 12 and output shaft 14 can be seen in more detail in FIG. 3. It will be clear that the configuration of the magnet member 12 and output shaft 14 is such that the two components cannot be assembled in a hardened state, and the present arrangement can therefore only be achieved by overmolding.

The overmolding process is such that the outer surface 26 of the magnet-contact body portion 20 of the output shaft 14 is, at the point of formation of the rotor assembly 10, contacts the inner surface 28 of the magnet member 12. It is, however, noted, that temperature fluctuations during operation of the rotor assembly 10 may result in slight separation of the magnet member 12 and output shaft 14 at the inner surface 28. The outer surface 26 of the output shaft 14 and the inner surface 28 of the magnet member 12 therefore form the shape-fit locking in the present arrangement. Alternative solutions could be considered, however, which maintain the relative lateral positions of the output shaft 14 and magnet member 12.

The relative positioning of the magnet member 12 and the output shaft 14 is maintained via complementarily-engagable interface elements thereon. The engagement between the complementarily-engagable interface elements prevents or limits relative dislocation between the magnet member 12 and the output shaft 14. It is noted that, from a lateral or rotational perspective, that the complementarily-engagable interface could be at least in part formed by the shape-fit arrangement of the inner surface 28 of the magnet member 12 and the outer surface 26 of the output shaft 14.

Guide projections 30 may additionally be formed, preferably as arcuate projections positioned proximate a circumference of the base 32 of the magnet member 12. These guide projections 30 may assist with transit during the manufacturing process.

Once such arrangement of complementarily-engagable interface elements is shown in FIG. 3. There is provided an inward projection 34 provided at the inner surface 28 of the magnet member 12, here positioned as a continuous circumferential projection disposed adjacent to the second opening 18 of the magnet member 12. It may be that the inward projection 34 acts to create the discrepancy between the sizes of the first and second openings 16, 18 of the magnet member 12.

On the output shaft 14 there is provided a complementary circumferential receiving channel 36 within which the inward projection 34 of the magnet member 12 is receivable, the receiving channel 36 defining upper and lower axial stops 38, 40 to prevent axial dislocation of the magnet member 12 and the output shaft 14.

The overmolding process results in the formation of either of the complementarily-engagable interface elements, whichever is formed second. Thus, if the magnet member 12 is molded first, then the output shaft 14 will be overmolded within the magnet member 12, thereby forming the receiving channel 36 around the inward projection 34 during the overmolding process. On the other hand, if the output shaft 14 is molded first, then the receiving channel 36 will define the shape, size and position of the inward projection 34 during the overmolding process of the magnet member 12.

The form of the complementarily-engagable interface elements as described is for illustrative purposes only. It will be readily understood that a non-continuous projection, that is, a plurality of circumferentially spaced-apart projections, could be provided extending from the inner surface 28 of the magnet member 12. In this scenario, a plurality of recesses would be formed in lieu of a continuous channel on the output shaft 14. Indeed, it will be understood that an outward projection on the output shaft 14 would result in a corresponding receiver on the magnet member 12, without altering the fit of the components to one another.

It will also be understood that the configuration of the complementarily-engagable interface elements could be reversed between the magnet member 12 and the output shaft 14, that is, that the output shaft 14 could include one or more projections, and the magnet member 12 could include a recess or channel.

The complementarily-engagable interface elements as described above provide an axial retaining means between the magnet member 12 and the output shaft 14. However, it may also be preferably to provide a rotational retaining means, to prevent relative rotation between the magnet member 12 and the output shaft 14. As mentioned above, this is provided in the present arrangement via the non-cylindrical shape-fit interface between the magnet member 12 and output shaft 14. As an alternative, a plurality of projections and recesses could be provided which are circumferentially spaced-apart. Another alternative would be to provide one or more secondary complementarily-engagable interface elements, which are preferably circumferentially asymmetric.

The relative shapes of the inner surface 28 of the magnet member 12 and the outer surface 26 of the output shaft 14 may also assist with the retention, in particular, in an axial direction. For example, an overhang 42 of the output shaft 14 could be provided at or adjacent to the first opening of the magnet member 14, which further improves the axial retention. This may be improved by providing a sloped wall portion 44 to create a wedging effect; a similar sloped wall arrangement may be provided at the upper axial stop 38, for example.

The present rotor assembly 10 is intended for use as part of an electric motor, such as a brushless motor, for example a stepper motor or BLDC motor, within which the rotor position is accurately determinable, for example, by use of one or more Hall sensors to determine the rotational position and/or phase of the rotor assembly 10. As such, the magnet member 12 is magnetised so as to have a bidirectional magnetisation, that is, magnetization in both the axial and radial directions.

Figure 4A:
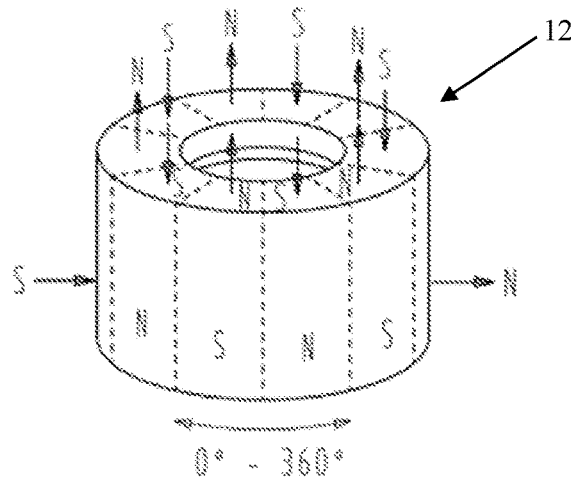
FIG. 4a shows a first possible magnetic configuration for the magnet member of the rotor assembly of FIG. 1.
Figure 4B:
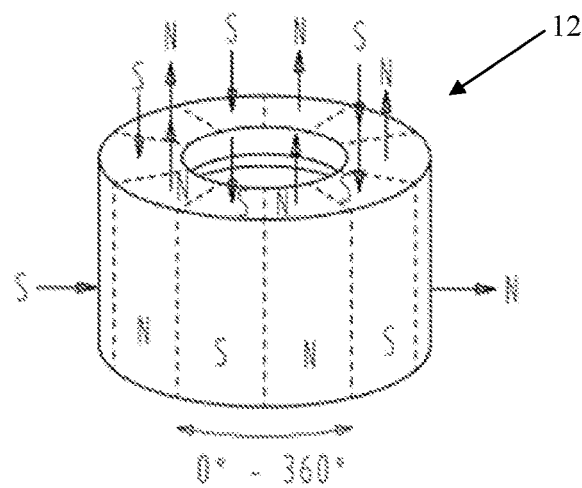
FIG. 4b shows a second possible magnetic configuration for the magnet member of the rotor assembly of FIG. 1.
Figure 5:
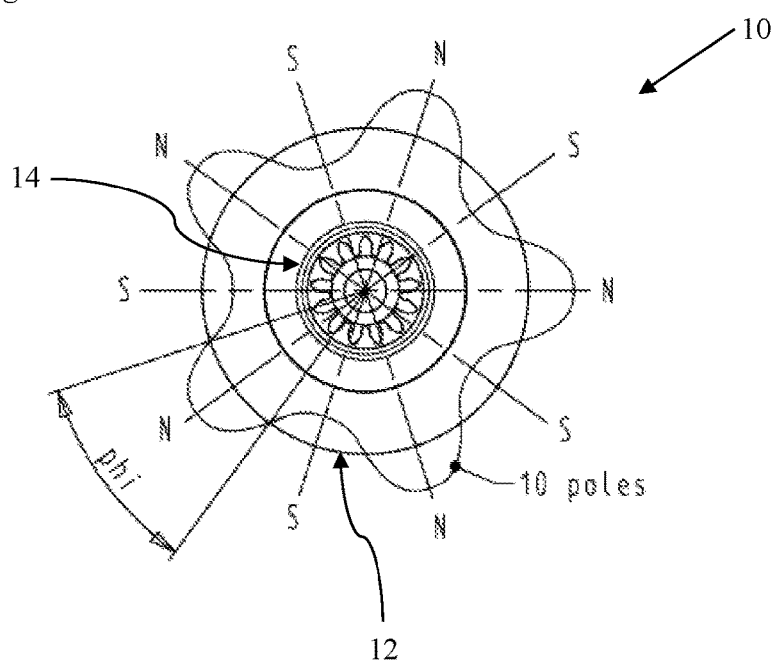
FIG. 5 shows a plan representation of the rotor assembly of FIG. 1, indicative the radial magnetic field arrangement thereof.

A first ten-pole magnetic configuration of the magnet member 12 is shown in FIG. 4a, having an alternating polarity in both the axial and radial directions. A second ten-pole magnetic configuration of the magnet member 12 is shown in FIG. 4b, in which the axial magnetization is reversed. The radial profile of either configuration can then be seen in FIG. 5. Any appropriate multi-pole magnetic configuration could be used, but between six and twenty poles is preferred.

Figure 6:
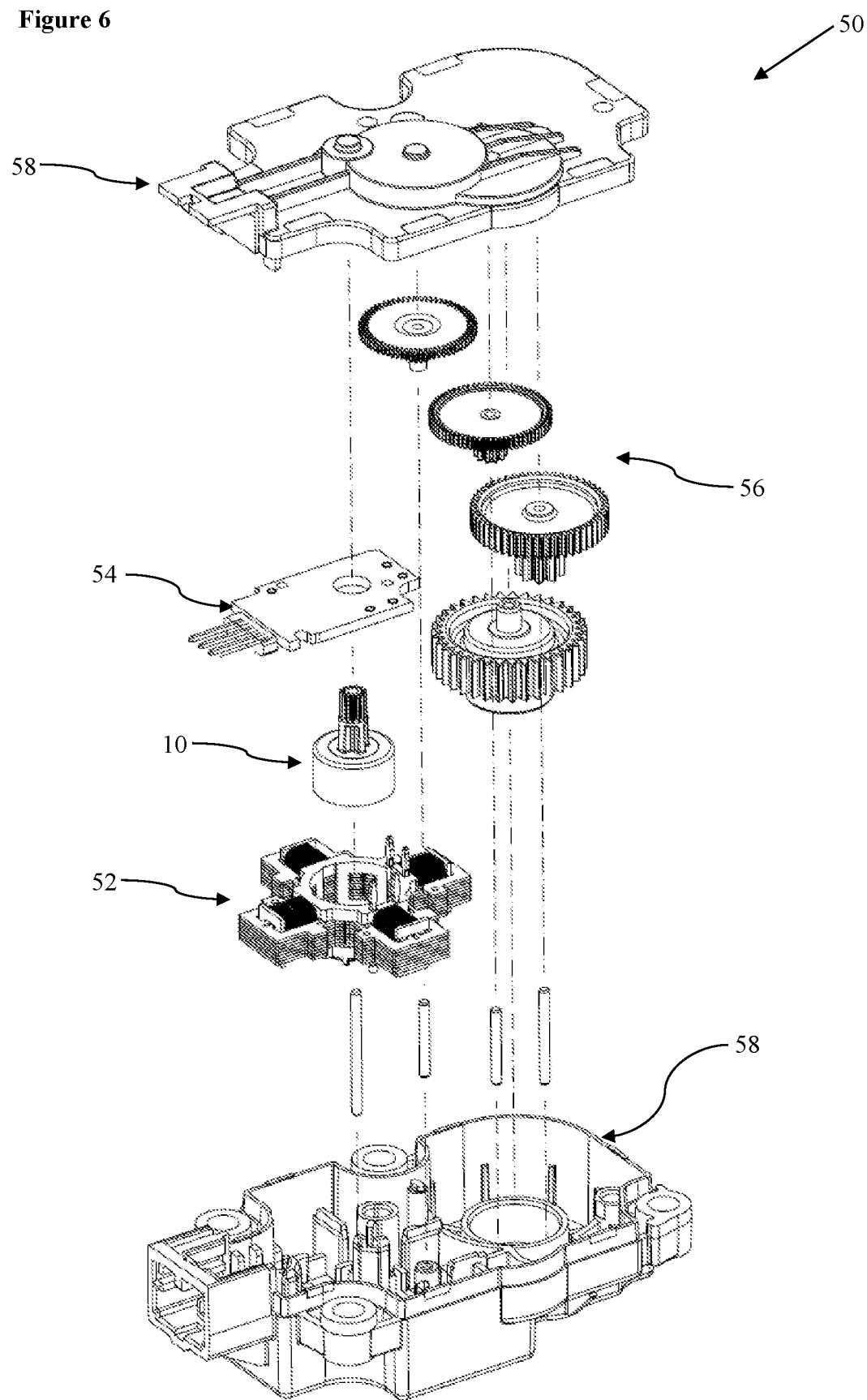
FIG. 6 shows a stepper motor in accordance with the second aspect of the disclosure.

A complete electric motor, preferably a brushless motor, here provided as a stepper motor 50 is illustrated in FIG. 6, illustrating the positioning of the rotor assembly 10 with respect to a stator 52, here indicated as a star-shaped stator, a control circuit 54, a gear train 56 and the housing 58 of the stepper motor 50.

A stepper motor 50 having such a rotor assembly 10 has a magnetic field profile which is readily detectable, and which is simple to manufacture, since the entire rotor assembly 10 is produced as a single component.

There are various factors to consider when manufacturing the rotor assembly 10. There are issues in creating a tooling which is capable of imparting the necessary magnetization to the magnet member 12. The use of electromagnetic coils, as is traditional in the art, raises two issues. Firstly, the coils produce a lot of heat, potentially causing difficulties during the overmolding process, and secondly, if a coil does not activate for any reason, then the magnetization process will result in a failed rotor.

To overcome this difficulty, the present disclosure provides a new mechanism for the manufacture of a rotor assembly 10.

Firstly, a first tooling is created, having a mold suitable for inserting of a first flowable material therein to produce either one of the magnet member 12 or the output shaft 14. Said component is then created by injection molding or a similar production technique.

A second tooling is then created which has a mold suitable for receiving the shape of the entire rotor assembly 10. The second flowable material is then injected into the second tooling, thereby creating the second component of the magnet member 12 or the output shaft 14.

One of the first and second toolings is embedded with a plurality of permanent magnets, the magnets being arranged to provide the necessary bi-directional magnetization to the magnet member 12 by virtue of their alternating polarities. The use of permanent magnets advantageously avoids the need to utilise electromagnetic coils as part of the tooling to impart the necessary magnetization to the magnet member 12 during manufacture.

This arrangement allows for the magnetization of the magnet member 12 to be potentially applied during the molding and setting or curing stage, since there is no risk of electromagnetic heating of the flowable material or materials in the tooling.

In one preferred embodiment, the output shaft 14 is molded first, with the magnet member 12 being overmolded second. The output shaft 14 is secured in the second tooling, and an injection nozzle provided, preferably at a non-functional edge of the magnet member 12 if possible, via which the moldable magnetic material is injected into the second tooling. The moldable magnetic material can be injected into the second tooling at a standard injection molding pressure, with the moldable magnetic material flowing to fill the void in the second tooling which matches the shape of the magnet member 12.

It is preferred that the injection points correspond with, or have a numerical relationship with, the positions of the magnetic poles of the magnet member 12, such that a rotationally symmetric magnetic field is produced. For example, the number of injection nozzles may be equal to the number of magnetic poles, may be a factor of the number of magnetic poles, such as half the number of magnetic poles, or may be proportional to the number of magnetic poles, such as double the number of magnetic poles. In one embodiment, the injection point for each injection nozzle is adjacent to the first opening 16 on a base 32 of the magnet member 12, filling the void along an axial direction of the rotor assembly.

Figure 7:
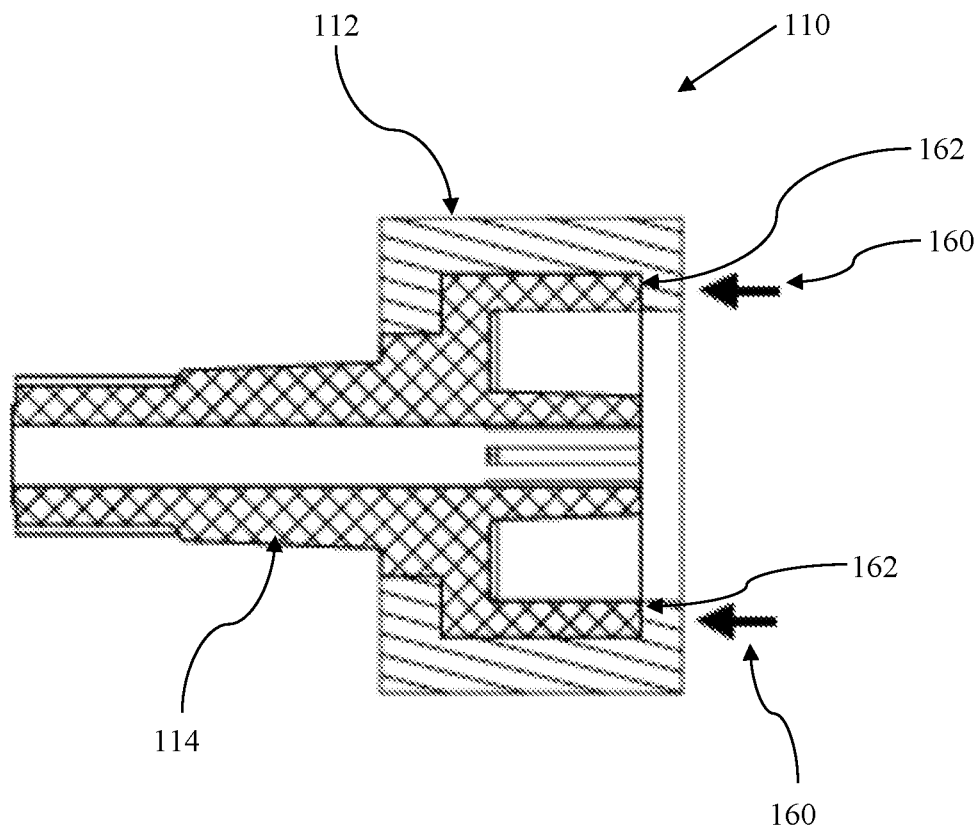
FIG. 7 shows a vertical cross-section through a second embodiment of a rotor assembly in accordance with the first aspect of the disclosure.

The injection process can result in one or more burrs forming on the edge of the magnet member 12, and therefore it may be preferred that one or more guide projections be formed on the base 32 which have a height greater than an expected height of the burrs. This prevents the burrs from snagging on any transitory mechanisms used during automated production of the rotor assembly 10 and housing. The guide projections 30 may assist with the transport of the rotor assembly 10 along such transitory mechanisms, such as transit tubes, during production.

Where the output shaft 14 is molded first, and the magnet member 12 is overmolded therearound, it has been found that injection of the moldable magnetic material at or adjacent to a radially outwardmost edge of the rotor assembly 10 can result in uneven magnetization through the magnet member 12. FIG. 7 shows an alternative rotor assembly indicated globally at 110; similar or identical features to those present in respect of the first embodiment of the rotor assembly with be referred to using similar or identical reference numerals, and further detailed description is omitted for brevity. The rotor assembly 110 may possibly have an improved homogeneity through the magnetic material.

The output shaft 114 is formed having one or more base portions 162. The base portion 162 may be formed as a ledge which spans the complete circumference of the output shaft 114, or could be formed as a plurality of indentations thereon. A boss or similar projection could conceivably be provided which extends beyond the base portion 162 of the output shaft 114, effectively forming the base portion 162 as a ledge, shoulder or lip on the output shaft 114.

The positions of injection nozzles 160 for the moldable magnetic material are indicated in FIG. 7, and these are aligned with the or each base portion 162 of the output shaft 114 when mounted in the second tooling. The moldable magnetic material is injected into the second tooling via the injection nozzles 160, and impacts the or each base portion 162. From this point of contact, the moldable magnetic material can then flow around the corner within the void of the second tooling, filling the entire void to form the magnet member 112.

It is therefore possible to provide a rotor assembly for a motor which is simple to construct, by virtue of overmolding the magnet member with the output shaft thereof. This requires fewer component parts to be assembled in the motor, thereby reducing the manufacturing complexity and cost of such a motor.

The present disclosure therefore provides a means of creating a magnet member having a bi-directional magnetic field, and an output shaft which is overmolded thereto, or vice versa, which is otherwise not possible to manufacture in the art.

The words 'comprises/comprising' and the words 'having/including' when used herein with reference to the present disclosure are used to specify the presence of stated features, integers, steps or components, but do not preclude the presence or addition of one or more other features, integers, steps, components or groups thereof.

It is appreciated that certain features of the disclosure, which are, for clarity, described in the context of separate embodiments, may also be provided in combination in a single embodiment. Conversely, various features of the disclosure which are, for brevity, described in the context of a single embodiment, may also be provided separately or in any suitable sub-combination.

The embodiments described above are provided by way of examples only, and various other modifications will be apparent to persons skilled in the field without departing from the scope of the disclosure as defined herein.

The invention claimed is:

1. A rotor assembly comprising:
   a cylindrical magnet member having magnetization in both axial and radial directions; and
   an output shaft, and at least part of the output shaft being receivable within the magnet member;
   wherein an inner surface of the magnet member and an outer surface of the output shaft have complementarily-engagable interface elements thereon to prevent or limit dislocation of the magnet member and output shaft, at least one of the interface elements being formed by overmolding of one of the magnet member and output shaft with the other of magnet member and output shaft,
   wherein the complementarily-engagable interface elements are circumferentially asymmetric.

2. The rotor assembly as claimed in claim 1, wherein the magnet member is formed from a mixture of magnetic material and polymer resin, and the magnetic material comprises rare earth magnetic material.

3. The rotor assembly as claimed in claim 1, wherein the output shaft is formed from a moldable material, and the magnet member being formed from a moldable magnetic material.

4. The rotor assembly as claimed in claim 1, wherein the output shaft comprises an integrally formed pinion gear.

5. The rotor assembly as claimed in claim 1, wherein the output shaft comprises at least one base portion.

6. The rotor assembly as claimed in claim 1, wherein the magnet member is a multi-pole magnet member.

7. The rotor assembly as claimed in claim 6, wherein the magnet member has between six and twenty poles.

8. The rotor assembly as claimed in claim 1, wherein the interface element of the magnet member comprises an inward projection, and the complementarily-engagable interface element of the output shaft is formed as a receiving channel for the inward projection of the magnet member.

9. The rotor assembly as claimed in claim 1, wherein the inner surface of the magnetic member and the outer surface of the output shaft form a shape-fit interface.

10. The rotor assembly as claimed in claim 1, wherein the magnet member comprises at least one guide projection on an axial end surface thereof.

11. An electric motor comprising a stator and a rotor assembly as claimed in claim 1.

12. An electric motor as claimed in claim 11, wherein the electric motor is a stepper motor or BLDC motor.

13. A method of forming a rotor assembly as claimed in claim 1, the method comprising the steps of:
   a] providing a first tooling having a mold shape to form one of the magnet member and output shaft;
   b] molding the one of the magnet member and output shaft by injecting a flowable material into the first tooling and allowing it to set;
   c] providing a second tooling having a mold shape to form the rotor assembly; and
   d] inserting the one of the magnet member and output shaft into the second tooling and injecting a flowable material into the second tooling and allowing it to set.

14. The method as claimed in claim 13, wherein the second tooling comprises a plurality of permanent magnets arranged to impart a bi-directional magnetization to the magnet member.

15. The method as claimed in claim 13, wherein the first tooling comprises a plurality of permanent magnets arranged to impart a bi-directional magnetization to the magnet member.

16. The method as claimed in claim 13, wherein during step a], the first tooling has a mold shape to form the output shaft, and, during step d], the injection of the flowable material into the second tooling is aligned to the at least a portion of the output shaft.

17. A method of forming a rotor assembly as claimed in claim 1, the method comprising the steps of:
a] providing a tooling having a mold shape to form the magnet member, the tooling comprising a plurality of permanent magnets arranged to impart a bi-directional magnetization to the magnet member;
b] inserting the output shaft into the tooling;
c] injecting a flowable magnetic material into the tooling around the output shaft and allowing the flowable magnetic material to set.

18. The method as claimed in claim 17, wherein during step c], the flowable magnetic material is injected via a number of injection nozzles which is equal to, proportional to, or a factor of a number of magnetic poles to be created by the plurality of permanent magnets, and the ratio of injection nozzles to magnetic poles is 1:2.

19. A tooling set for manufacturing a rotor assembly as claimed in claim 1, the tooling set comprising a first tooling having a mold shape to form one of the magnet member and output shaft, and a second tooling having a mold shape to form the rotor assembly, wherein one of the first and second toolings comprises a plurality of permanent magnets arranged to impart a bi-directional magnetization to the magnet member.

20. The rotor assembly as claimed in claim 1, wherein the complementarily-engagable interface elements comprise an inner surface of the magnet member having a plurality of circumferentially spaced-apart projections.

* * * * *